Oct. 23, 1928.
J. ASTROM
1,688,915
APPARATUS FOR TREATING LIQUIDS
Filed Dec. 10, 1926　　2 Sheets-Sheet 1
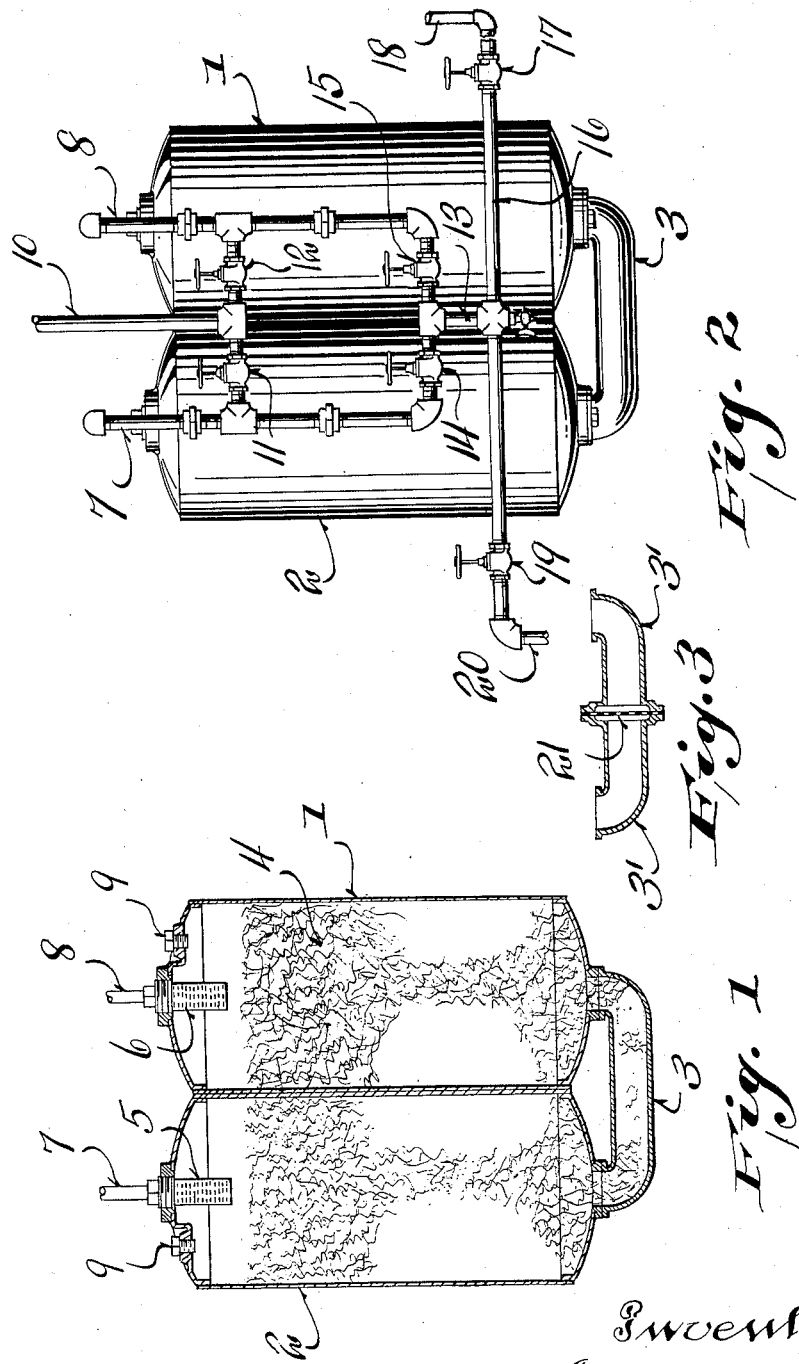

Oct. 23, 1928.  
J. ASTROM  
1,688,915  
APPARATUS FOR TREATING LIQUIDS  
Filed Dec. 10, 1926  
2 Sheets-Sheet 2
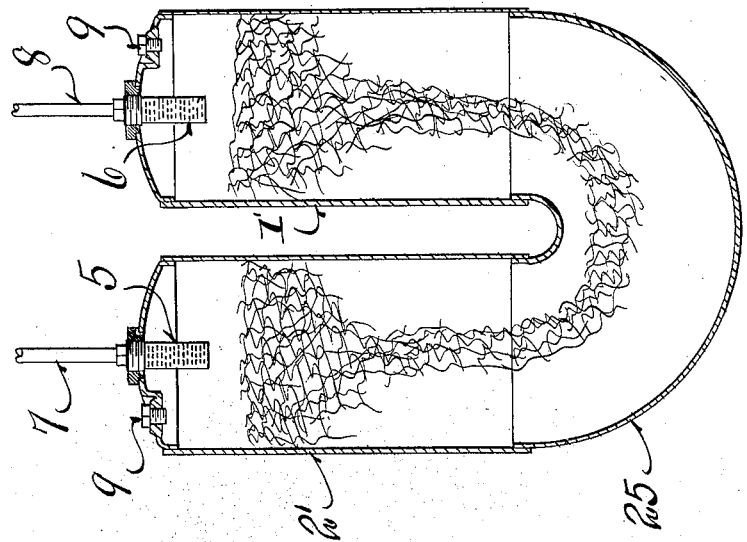
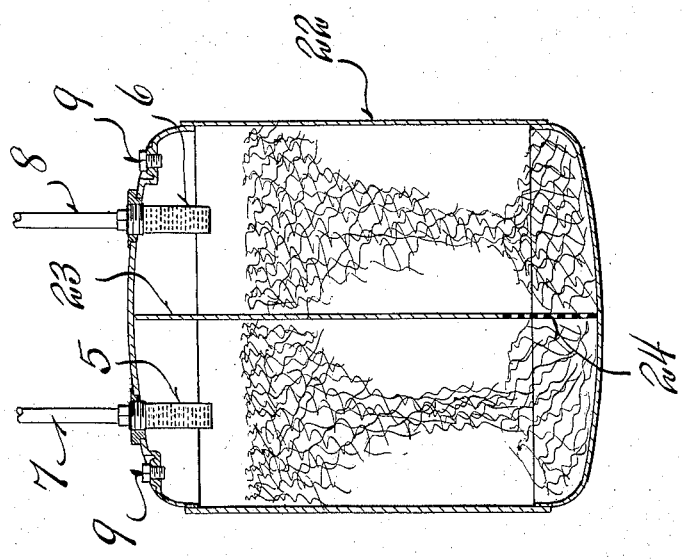

Patented Oct. 23, 1928.

1,688,915

UNITED STATES PATENT OFFICE.

JOHN ASTROM, OF FORT WAYNE, INDIANA, ASSIGNOR OF ONE-HALF TO DEISTER MACHINE COMPANY, OF FORT WAYNE, INDIANA, A CORPORATION.

APPARATUS FOR TREATING LIQUIDS.

Application filed December 10, 1926. Serial No. 153,885.

This invention relates to an apparatus for treating liquids, and is particularly directed to an apparatus for treating water.

In water softening devices working on the base exchange principle it is the practice to employ sodium base minerals which are supported upon perforated plates, covered by fine mesh screens, or similar structures, in such a manner that a water space is provided below the mineral. For the purpose of regeneration a salt solution is introduced which, after sufficient time of contact with the mineral, is washed out. It has been found that the mineral supporting structures have a tendency to become partially clogged by fine particles of the mineral above or by impurities from the water below, or both, in such a way as to cause the water to channel through the mineral in which therefore inactive spaces or pockets are formed. These prevent efficient softening of the water as well as washing out of the unused brine. This invention is designed to overcome the above noted defects and objects of such invention are to provide a device for treating water, such, for instance, as a water softener, in which no screens are required for supporting the active material and in which the water enters the material unobstructedly.

Further objects of the invention are to provide a water treating device in which the material is carried in two compartments, so that by the division of same into two distinct portions the height of the material is reduced and thereby its tendency to crush and pack, and whereby its loosening up and agitation during regeneration and washing is greatly facilitated.

Further objects of the invention are to provide a water treating device in which the raw water may enter where it previously left and thus insure thorough utilization of the material in a uniform manner, and to so arrange the apparatus that the water enters and leaves the material at its highest point no matter in which direction the flow takes place, so that the material freely separates from the water by the action of gravity at a point where a free space is provided between same and the strainer located in the ceiling of said space.

Further objects are to provide a very simple and serviceable device which may be constructed by ordinary methods, and which by the omission of a free space below and by division into two compartments will not require a great deal of headroom.

Embodiments of the invention are shown in the accompanying drawings in which:

Figure 1 is a sectional view through the apparatus;

Figure 2 is an elevation of the structure shown in Figure 1;

Figure 3 is a sectional detail of a modified form;

Figure 4 shows a further form of the apparatus in section;

Figure 5 shows a still further form, also in section.

Figures 1 and 2 showing one form of the apparatus will first be described.

It is to be noted in reference to Figures 1 and 2 that the softening device consists of two chambers 1 and 2 of substantially the same height and joined by a connecting portion 3 at their lower ends. This connecting portion, in reality, consists of a relatively large pipe forming in effect a continuation of the two chambers. The pipe thus forms a U-shaped continuation of the chambers. No screens are employed for supporting the active material, but instead the active material 4 is placed in the chambers or containers 1 and 2 and also fills the pipe 3. It stops short a material distance of the upper ends of the chambers and provides an adequate space for the strainers 5 and 6, such strainers communicating with the pipes 7 and 8. Further, it is to be noted that the top of each of the chambers is provided with a removable plug 9 so that salt or a salt solution may be readily added for rejuvenating the softening material, when such material becomes exhausted.

Referring to Figure 2, it will be seen that the raw or untreated water enters through the pipe 10 which constitutes therefore, the supply pipe. This pipe branches and communicates with the pipes 7 and 8 and is controlled by means of valves 11 and 12. Further, the pipes 7 and 8 continue downwardly through the medium of T's and connect with a short pipe 13, communication being controlled by means of the valves 14 and 15. The pipe 13 passes to a transverse pipe 16 provided with a valve 17 controlling communication to the service pipe 18, and also provided with a valve 19 controlling communication with the waste pipe 20, The operation of the apparatus is as follows:

Assume, for example, that the water enters the pipe 10 passes through the valve 11 to the pipe 7 and enters the upper portion of the chamber 2. The valves 14 and 12 are closed. The water passes downwardly through the chamber 2, through the pipe 3, and upwardly through the chamber 1, leaving by way of the pipe 8. It passes downwardly past the valve 15 through the outlet pipe 13 to the service pipe, the valve 17 being opened, and the valve 19 being closed.

When the material becomes partly exhausted, the flow of water through the treating chambers may be reversed by closing the valves 11 and 15 and opening the valves 12 and 14. Under this condition, the water enters the upper portion of the chamber 1, passes downwardly through the chamber 1, through the pipe 3, and thence upwardly through the chamber 2, finally passing through the service pipe. Thus, the unused material is immediately and easily placed in position for contacting with the entering water, so that the maximum efficiency or effectiveness of the apparatus can be secured.

When the material is exhausted, the valves 11 and 12 are closed, as well as the valve 17 and, if desired, the valves 14 and 15 may be closed. One or both of the plugs are removed and brine is added to the upper portion of the treating chambers. It is allowed to soak through the active softening material and to thus regenerate it. After a sufficient time has elapsed, washing takes place as follows: The valves 12 and 14 are opened, and the valve 19 leading to the waste pipe is also opened. This permits the water to flow downwardly through the chamber 1, upwardly through the chamber 2, and from thence to the waste pipe. After washing in this direction has continued for the requisite length of time, the flow may be reversed by closing the valves 12 and 14, and opening the valves 11 and 15. The water now passes downwardly through the tank 2, upwardly through the tank 1, and from thence to the waste pipe, thus securing a reverse direction of the flow of the washing water. It is to be noted that in this washing process two distinct portions of the treating materials such, for example, as zeolites, are caused to boil or loosen up, due to the upward flowing of the water. Further, it is to be noted that the treating material is not packed by a large weight consequent upon a high head of the material, as the head of the material is only half that usually required. Thus, the salt solution and the washing water may freely reach all portions of the material as they are not packed. Further, the material separates from the water, irrespective of the direction of travel of the water, by the action of gravity, and thus no screens are required for holding the material in place.

After the washing has been completed, the drain valve 19 is closed and the service valve 17 is opened. The flow may take place in either direction desired. For example, the valves 12 and 14 may be opened, and the valves 11 and 15 closed. The water enters at the upper portion of the treating chamber or tank 1, and leaves at the upper portion of the treating chamber or tank 2.

If desired, this device may be made as a combined water softener and filter by filling one of the compartments with filtering material, and the other compartment with water softening material. Under these conditions, the water is caused to pass first through the filtering material and thereafter through the softening material, and from thence to the service main. This combination of filter and softener is very effective as the foreign materials are readily picked up by the filter prior to the arrival of the water at the softening material, and thus the softening material is protected from any accumulation of foreign material.

Under some conditions, it may be found desirable to provide a screen or perforated plate in the pipe 3. For instance, as shown in Figure 3, the perforated plate is indicated by the reference character 21, and the two sections of the pipe 3 are represented by the reference character 3'. It is to be noted that the screen is not called upon to bear the weight of the materials, as the weight is borne by the tanks and the connecting pipe 3', and not by the screen.

In the modified form shown in Figure 4, the same idea is followed, as that previously described, although a slightly different construction of tank is used. In this form of the invention, a single container 22 is employed and is separated into two compartments by means of a division plate 23 which extends downwardly from the upper portion of the tank to adjacent the bottom, and may be wholly open at the bottom, or may be provided with a perforated portion 24.

In the form shown in Figure 5, the same idea is followed. In this form, the two tanks or containers 1' and 2' are joined by a U-shaped portion 25 which is of the same diameter as the tanks. In other words, the tanks are simply bent so as to form a U-shaped container. Otherwise, the apparatus is the same as that previously described.

It will be seen that a very simple type of apparatus has been provided for treating liquids such, for example, as a water softening device which is so constructed that no screens are required for carrying the weight of the softening material, but in which the weight of the softening material is carried directly by the tanks or containers themselves. Further, it will be seen that packing or crushing of the material can not occur, as the height of such material is very small, and may not be more than half that usually employed. Further, it will be seen that the material separates from the leaving water by the action of gravity.

It will be seen further that an extremely compact and simple device has been provided by this invention, and one which may be readily produced and easily operated.

Although the invention has been described in considerable detail, such description is intended as illustrative rather than limiting as the invention may be variously embodied and as the scope of such invention is to be determined as claimed.

I claim:

1. A liquid treating device comprising two compartments, one end of one compartment permanently communicating with one end of the other compartment, means for passing liquid in either direction through said compartments, and liquid treating means carried within said compartments and their communicating parts, the communicating parts being of comparatively large cross section so that the liquid treating means will freely pass into the communicating parts.

2. A liquid treating device comprising a container having two closed upwardly extending compartments permanently and unobstructedly communicating at their lower ends, a liquid supply pipe, an outlet pipe, and means for connecting either of said pipes to the upper portion of either of said compartments, the communication between said compartments being established by a connecting portion, and a continuous, unobstructed and permanently positioned liquid treating bed extending through both compartments and the connecting portion, the connecting portion being relatively large in cross section so that the liquid treating material may freely enter the connecting portion.

3. A liquid treating device comprising a container having two closed upwardly extending compartments permanently and unobstructedly communicating at their lower ends, liquid treating material carried in each of said compartments, a supply pipe, a service pipe, a waste pipe, means for connecting said supply pipe to the upper end of either of said compartments and for connecting either the service pipe or the waste pipe to the upper end of either of said compartments, whereby the liquid may be passed from the supply pipe in either direction through the compartments and may be discharged into either the service pipe or the waste pipe, the communication between said compartments being established by a connecting portion, and a continuous, unobstructed and permanently positioned liquid treating bed extending through both compartments and the connecting portion, the connecting portion being relatively large in cross section so that the liquid treating material may freely enter the connecting portion.

4. A liquid treating device comprising two closed compartments having juxtaposed communicating ends, means permitting the introduction of a regenerating agent into either of said compartments, a supply pipe, a service pipe, a waste pipe, means for connecting said supply pipe to either of the compartments at its end opposite the said communicating end, means for connecting either the waste pipe or the service pipe to either compartment at its end opposite the said communicating end, the communication between said compartments being established by a connecting portion, and a continuous, unobstructed and permanently positioned liquid treating bed extending through both compartments and the connecting portion, the connecting portion being relatively large in cross section so that the liquid treating material may freely enter the connecting portion.

5. A liquid treating device comprising a pair of closed vertical compartments communicating at their lower ends, a supply pipe having branches leading to the upper end of each of said compartments, valves in said branches, an outlet pipe having branches leading to the upper end of each of said compartments, valves in the branches of the outlet pipe, the communication between said compartments being established by a connecting portion, and a continuous, unobstructed and permanently positioned liquid treating bed extending through both compartments and the connecting portion, the connecting portion being relatively large in cross section so that the liquid treating material may freely enter the connecting portion.

6. A liquid treating device comprising a pair of closed vertical compartments communicating at their lower ends, a supply pipe having branches leading to the upper end of each of said compartments, valves in said branches, an outlet pipe having branches leading to the upper end of each of said compartments, valves in the branches of the outlet pipe, a service pipe, a waste pipe, valves in said service and waste pipes, said service pipe and said waste pipe being connected to said outlet pipe, the communication between said compartments being established by a connecting portion, and a continuous, unobstructed and permanently positioned liquid treating bed extending through both compartments and the connecting portion, the connecting portion being relatively large in cross section so that the liquid treating material may freely enter the connecting portion.

7. A water softener comprising a pair of tanks connected at their lower ends to form a U-shaped compartment, water softening material extending from adjacent the upper end of one tank to adjacent the upper end of the other tank and through the connecting portion at the lower end of the tanks, a supply pipe, a service pipe, and valves for causing the water to flow from the service pipe into the upper end of one tank and from the upper end of the other tank to the service pipe and for reversing such flow.

8. A water softener comprising a pair of tanks connected at their lower ends to form a U-shaped compartment, water softening material extending from adjacent the upper end of one tank to adjacent the upper end of the other tank and through the connecting portion at the lower ends of the tanks, a supply pipe, a service pipe, a waste pipe and valves for causing the water to flow from the service pipe into the upper end of one tank and from the upper end of the other tank to either the service pipe or the discharge pipe and for reversing such flow.

In testimony that I claim the foregoing I have hereunto set my hand at Fort Wayne, in the county of Allen and State of Indiana.

JOHN ASTROM.